United States Patent
Hwang et al.

(10) Patent No.: US 8,988,401 B2
(45) Date of Patent: Mar. 24, 2015

(54) DISPLAY DEVICE AND METHOD OF DRIVING THE SAME

(75) Inventors: Moon-Sang Hwang, Yongin (KR); Won-Jun Choe, Yongin (KR); Sang-Soo Kim, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 224 days.

(21) Appl. No.: 13/252,010

(22) Filed: Oct. 3, 2011

(65) Prior Publication Data

US 2012/0256972 A1 Oct. 11, 2012

(30) Foreign Application Priority Data

Apr. 8, 2011 (KR) .................. 10-2011-0032872

(51) Int. Cl.
G09G 3/00 (2006.01)
G09G 5/00 (2006.01)
G09G 3/20 (2006.01)
H04N 13/04 (2006.01)

(52) U.S. Cl.
CPC .............. *G09G 5/003* (2013.01); *G09G 3/2092* (2013.01); *H04N 13/0438* (2013.01); *G09G 2370/08* (2013.01)
USPC ........................................................ 345/204

(58) Field of Classification Search
USPC ........... 345/76, 104, 204, 211, 213, 214, 690, 345/102; 370/479; 382/164
See application file for complete search history.

(56) References Cited

U.S. PATENT DOCUMENTS

2001/0048408 A1* 12/2001 Koyama et al. ................. 345/76
2006/0125771 A1* 6/2006 Inuzuka et al. ................. 345/102
2009/0167750 A1* 7/2009 Hong et al. ..................... 345/213
2009/0237395 A1* 9/2009 Lee ................................. 345/214

FOREIGN PATENT DOCUMENTS

| KR | 10-1999-00328 00 A | 5/1999 |
| KR | 10-2000-0077451 | 12/2000 |
| KR | 10-0433239 B1 | 5/2004 |
| KR | 10-0677153 B1 | 2/2007 |
| KR | 10-0864979 B1 | 10/2008 |

OTHER PUBLICATIONS

Won Jun Choe et al., "3-pair Intra-panel Interface for 120Hz 3D Flat Panel Displays," *OLED R&D Center, Samsung Mobile Display Co., Ltd.*, Technical Summary provided by the Inventor Mar. 7, 2011, pp. 1-5.

* cited by examiner

*Primary Examiner* — Ariel Balaoing
*Assistant Examiner* — Sepehr Azari
(74) *Attorney, Agent, or Firm* — Knobbe Martens Olson & Bear LLP

(57) ABSTRACT

A display device is disclosed. According to some aspects, the display device includes a display panel for displaying an image, data drivers for supplying data signals to the display panel such that the display panel displays an image, and a timing controller for setting the data drivers and 3n (where n is a natural number) ports. The display device is configured to transmit an R transmission signal including R data bits, a G transmission signal including G data bits, and a B transmission signal including B data bits to the data drivers through the 3n ports. According to some aspects, a display device capable of securing a band width required for driving a three dimensional image without unnecessarily increasing ports and without increasing the transmission speed of the ports and a method of driving the same are disclosed.

9 Claims, 4 Drawing Sheets

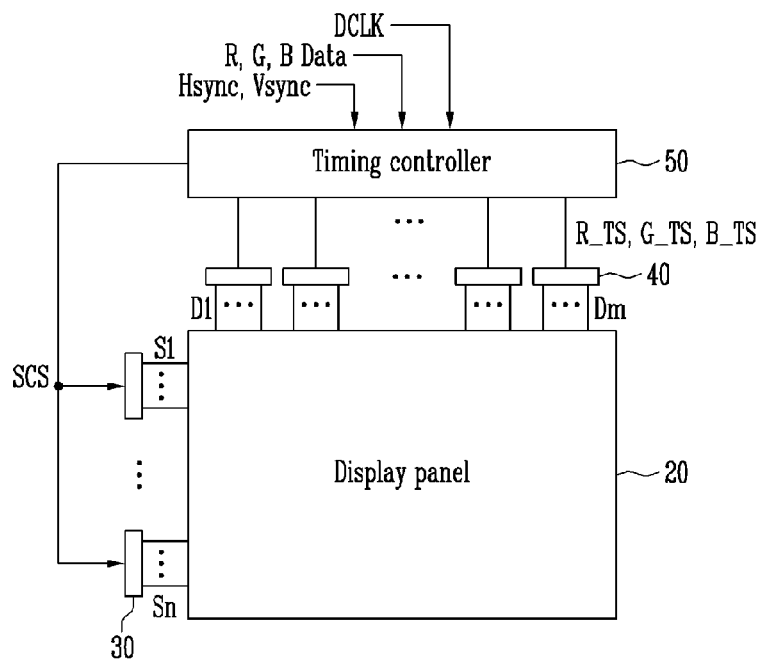
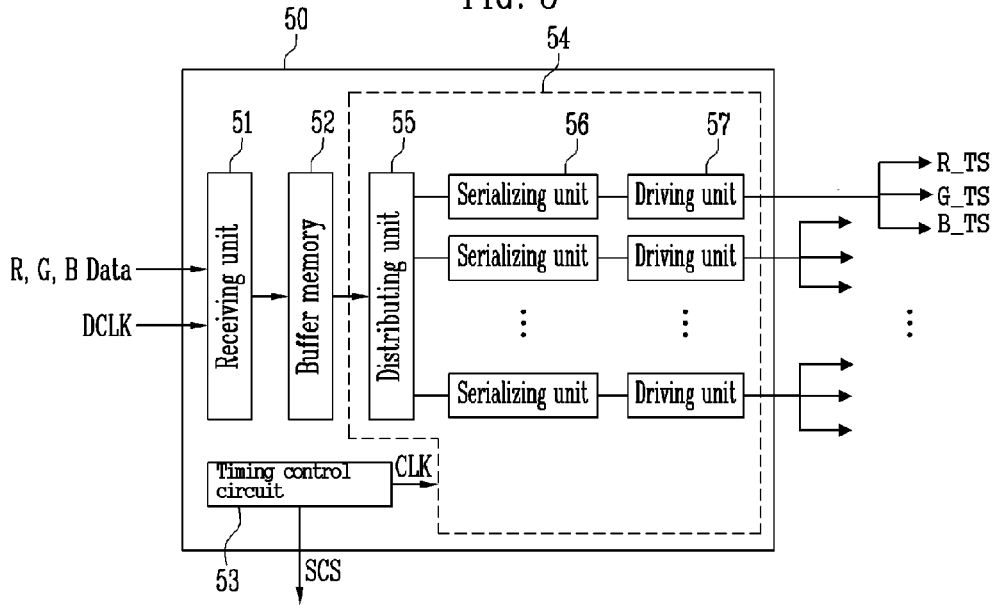

DISPLAY DEVICE AND METHOD OF DRIVING THE SAME

CROSS-REFERENCE TO RELATED APPLICATIONS

This application claims priority to and the benefit of Korean Patent Application No. 10-2011-0032872, filed on Apr. 8, 2011, in the Korean Intellectual Property Office, the entire content of which is incorporated herein by reference.

BACKGROUND

1. Field

The disclosed technology relates to a display device and a method of driving the same, and more particularly, to a display device having an improved intra panel interface between a timing controller and data drivers and a method of driving the same.

2. Description of the Related Technology

Recently, various image display technologies capable of reducing weight and volume of a display relative to conventional cathode ray tubes (CRT) have been developed. Popular display technologies that have been and are being commercialized include a liquid crystal display (LCD), a field emission display (FED), a plasma display panel (PDP), and an organic light emitting diode (OLED) display.

With the advent and refinement of such displays, an emphasis of recent research has been on three dimensional image display technology.

A three dimensional display can be implemented with a binocular parallax effect. Use of this effect is perhaps the greatest contributing factor in allowing for display of a three dimensional image of the object at a close range. Some methods use special purpose spectacles, while others do not. Spectacle technologies include an anaglyph method: wearing blue and red spectacles on both eyes, a polarizing method: wearing polarizing spectacles having different polarizing directions, and a liquid crystal shutter spectacle method (or a time division method): periodically repeating a time divided screen and of wearing spectacles having a liquid crystal shutter that is synchronized with the period of a displayed image.

The liquid crystal shutter method has been the focus of strong commercial demand and it will be described with reference to FIGS. 1A, 1B, and 1C.

FIG. 1A is a view illustrating a conventional driving method of displaying a three dimensional image. For example; a display device is driven with a driving frequency of about 120 Hz.

According to the illustrated method, the display device alternately displays a left eye image (LE) and a right eye image (RE) and the liquid crystal shutter spectacles alternately open and close left and right lenses in synchronization with the displays of LE and RE so that LE is transmitted to the left eye of a viewer and that RE is transmitted to the right eye of the viewer.

However, in the driving method of FIG. 1A, LE and RE overlap in most display time regions such that crosstalk between the images is generated.

Therefore, in order to solve this problem, as illustrated in FIGS. 1B and 1C, a black image is inserted between the times that the respective images are driven.

However, when a black image is inserted, data writing time is reduced by approximately half such that the operation speed of data drivers must be doubled. For example, the display device driven by a driving frequency of about 120 Hz in FIG. 1A should be driven by a driving frequency of about 240 Hz as illustrated in FIGS. 1B and 1C.

In addition, in order for the data drivers to write data to a display panel at a speed twice as fast as the conventional speed, the transmission speed of data transmitted from a timing controller to the data drivers should also be proportionally increased. Therefore, it is advantageous to increase the transmission speed of the data transmitted from the timing controller to the data drivers.

SUMMARY OF CERTAIN INVENTIVE ASPECTS

According to one aspect, a display device is disclosed. The display device includes a display panel configured to display an image, a plurality of data drivers configured to supply data signals to the display panel so that the display panel displays an image, and a timing controller configured to set the data drivers and 3n (n is a natural number) ports, where n is an integer. An R transmission signal including R data bits, a G transmission signal including G data bits, and a B transmission signal including B data bits are transmitted to the data drivers through different the 3n ports.

According to another aspect, a method of driving a display device is disclosed. The method includes setting 3n ports between a timing controller and data drivers, where n is an integer, and transmitting an R transmission signal including R data bits, a G transmission signal including G data bits, and a B transmission signal including B data bits from the timing controller to the data drivers through the 3n ports.

BRIEF DESCRIPTION OF THE DRAWINGS

The accompanying drawings, together with the specification, illustrate some embodiments of the present invention, and, together with the description, serve to explain the principles of the present invention.

FIG. 2 is a view illustrating a display device according to some embodiments;

FIG. 3 is a view illustrating a timing controller according to some embodiments;

DETAILED DESCRIPTION OF CERTAIN INVENTIVE EMBODIMENTS

Figure 1A:
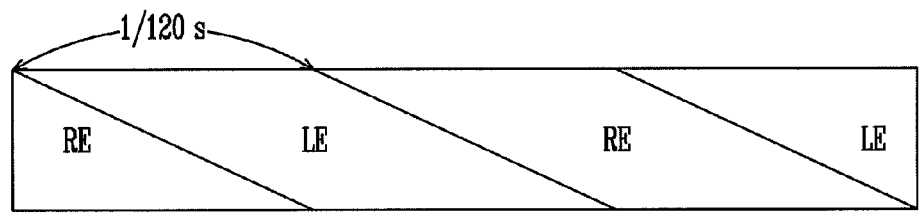
FIGS. 1A, 1B, and 1C are views illustrating conventional driving methods of displaying a three dimensional image.
Figure 1B:
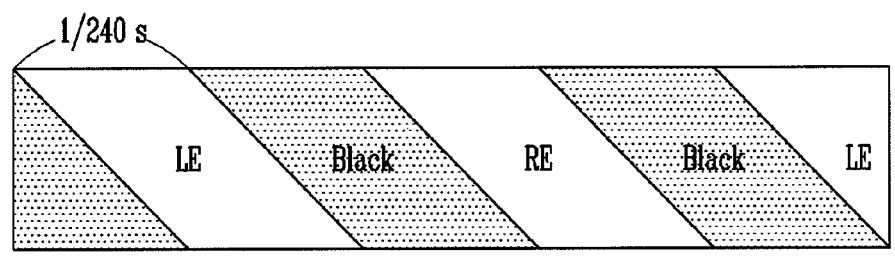
Figure 1C:
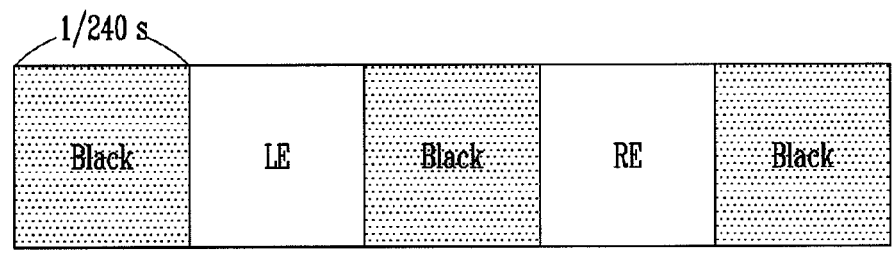

Hereinafter, certain embodiments will be described with reference to the accompanying drawings. Throughout the description, when a first element is described as being coupled to a second element, the first element may not only be directly coupled to the second element but may also be indirectly coupled to the second element via a third element. Further, some of the elements that are not essential to the complete understanding of the invention are omitted for clarity. Also, like reference numerals refer to like elements throughout.

The advantages and characteristics of the present invention and a method of achieving the advantages and characteristics of the present invention will now be described more fully with reference to the accompanying drawings, in which some embodiments of the invention are shown. This invention may, however, be embodied in many different forms and should not be construed as being limited to the embodiments set forth herein.

Hereinafter, the present invention will be described with reference to the accompanying drawings.

FIG. 2 is a view illustrating a display device according to some embodiments.

The display device according to some embodiments includes a display panel 20, scan drivers 30 for supplying scan signals to the display panel 20, data drivers 40 for supplying data signals to the display panel 20, and a timing controller 50.

The display panel 20 is configured to display an image in accordance with the scan signals and the data signals. The display may be formed of various display panels such as a liquid crystal display (LCD) panel, a plasma display panel (PDP), and an organic light emitting diode (OLED) display panel.

The display panel 20 includes a plurality of pixels (not shown) that emit red, green, and blue light components. The pixels receive the scan signals from the scan drivers 30 through scan lines S1 to Sn and receive the data signals from the data drivers 40 through the data lines D1 to Dm.

The scan drivers 30 are generally controlled by the timing controller 50 to generate the scan signals in response to a scan driver control signal SCS supplied from the timing controller 50 and to supply the generated scan signals to the pixels through the scan lines S1 to Sn.

The scan drivers 30 may be formed of a plurality of drivers as illustrated in FIG. 2 and may be formed as an integrated circuit (IC).

The data drivers 40 is controlled by the timing controller 50 and supply the data signals to the pixels using transmission signals R_TS, G_TS, and B_TS supplied from the timing controller 50.

The data drivers 40 may be formed of the plurality of drivers as illustrated in FIG. 2 like the scan drivers 30 and may be realized by the IC.

The timing controller 50 controls the driving of the scan drivers 30 and the data drivers 40 and, in particular, sets 3n (where n is a natural number) ports together with the data drivers 40 in order to transmit the transmission signals R_TS, G_TS, and B_TS.

In addition, the timing controller 50 transmits the transmission signals R_TS, G_TS, and B_TS through the ports set between the data drivers 40 and the timing controller 50 and the transmission signals R_TS, G_TS, and B_TS are transmitted to the data drivers 40 through different ports.

The R transmission signal R_TS including R data bits for determining the gray levels of red pixels may further include embedded dummy bits and clock signals.

The G transmission signal G_TS including G data bits for determining the gray levels of green pixels may further include the embedded dummy bits and clock signals.

The B transmission signal B_TS including B data bits for determining the gray levels of blue pixels may further include the embedded dummy bits and clock signals.

FIG. 3 is a view illustrating a timing controller according to some embodiments. With reference to FIG. 3, the timing controller 50 may include a receiving unit 51, a buffer memory 52, a timing control circuit 53, and a transmitting unit 54.

The receiving unit 51 receives image data signals R, G, and B data input to the timing controller 50 and may receive control signals such as a dot clock DCLK, a vertical synchronizing signal Vsync, and a horizontal synchronizing signal Hsync.

The buffer memory 52 may temporarily store the image data R, G, and B data received by the receiving unit 51 to output the stored image data R, G, and B data.

The timing control circuit 53 may generate the scan driver control signal SCS output to the scan drivers 30 using the control signals received by the receiving unit 51 and may generate a clock signal CLK to be embedded in the transmission signals R_TS, G_TS, and B_TS.

The transmitting unit 54 receives the image data R, G, and B data output by the buffer memory 52 to output the plurality of transmission signals R_TS, G_TS, and B TS to be transmitted to the data drivers 40. Serialized data bits are included in the transmission signals R_TS, G_TS, and B_TS.

In addition, the transmitting unit 54 may embed the clock signal CLK generated by the timing control circuit 53 in the respective transmission signals R_TS, G_TS, and B_TS and the dummy bits may be embedded together.

The transmitting unit 54 may include a distributing unit 55, serializing units 56, and driving units 57.

The distributing unit 55 divides the image data R, G, and B data output from the buffer memory 52 by the data drivers 40 to transmit the image data R, G, and B data to serializing units 56.

The serializing units 56 serialize the data transmitted from the distributing unit 55 to output the serialized data. That is, the serializing units 56 convert the data bits to serial data corresponding to the image data R, G, and B data transmitted from the distributing unit 55 to output the transmission signals R_TS, G_TS, and B_TS including the data bits.

The R data bits, the G data bits, and the B data bits are separately serialized such that the driving units 57 may output the transmission signals R_TS, G_TS, and B_TS to different ports.

In addition, the serializing units 56 may embed the clock signal CLK generated by the timing control circuit 53 and the dummy bits in the transmission signals R_TS, G_TS, and B_TS.

The driving units 57 output the transmission signals R_TS, G_TS, and B_TS output from the serializing units 56 to different ports in parallel. In addition, the transmission signals R_TS, G_TS, and B_TS may be transmitted in a differential signaling method.

That is, when three ports exist between the data drivers 40 and the timing controller 50, the R transmission signal R_TS is output to the first port, the G transmission signal G_TS is output to the second port, and the B transmission signal B_TS is output to the third port.

The serializing units 56 and the driving units 57 may be formed as a plurality of units, and the number of serializing units 56 and driving units 57 may correspond to the number of data drivers 40.

Figure 4:
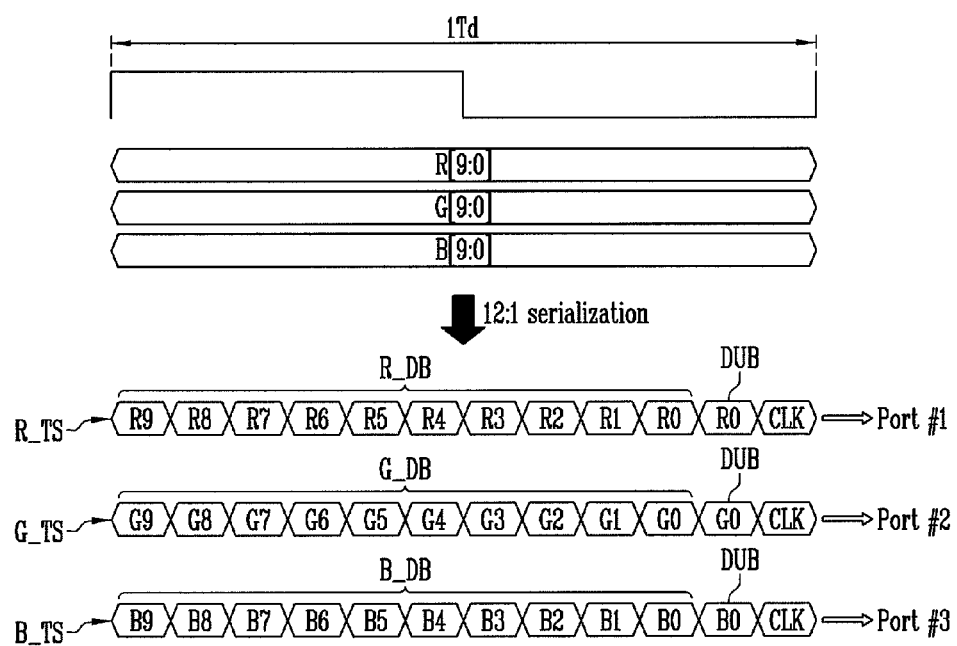
FIG. 4 is a waveform chart illustrating a method of driving the timing controller according to some embodiments.

FIG. 4 is a waveform chart illustrating a method of driving the timing controller according to the embodiment of the present invention.

In FIG. 4, three ports are set between the timing controller 50 and the data drivers 40. However, the number of ports is not limited thereto. For example, embodiments may include any number of ports in multiples of 3 such as 6, 9, and 12 ports.

The distributing unit 55 divides the image data R, G, and B data by the respective data drivers 40 using a dot clock DCLK input to the receiving unit 51 to transmit the image data R, G, and B data to the serializing units 56.

For example, when the gray levels of the pixels are set as 1,024, in order to display the gray levels, data signals of 10 bits may be required. Therefore, the distributing unit 55 extracts the R, G, and B data signals of 10 bits in accordance with the one period (1Td) of the dot clock DCLK to transmit the data signals to the serializing units 56.

The serializing units 56 serialize the received R data bits R_DB, G data bits G_DB, and B data bits B_DB to embed dummy bits DUB and clock signals CLK in the serialized data bits R_DB, G_DB, and B_DB and to generate the transmission signals R_TS, G_TS, and B_TS.

In addition, the transmission signals R_TS, G_TS, and B_TS output from the serializing units 56 are output to different ports port#1, port#2, and port#3.

For example, the R transmission signal R_TS is output to the data drivers 40 through the first port port#1, the G transmission signal G_TS is output to the data drivers 40 through the second port port#2, and the B transmission signal B_TS is output to the data drivers 40 through the third port port#3.

Figure 5A:
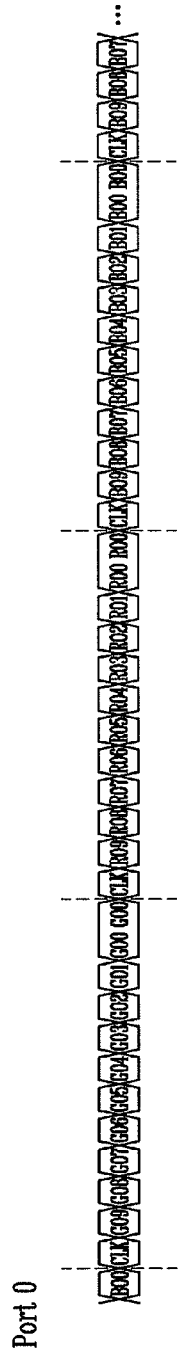
FIGS. 5A and 5B are views illustrating a conventional driving method in comparison with the method of driving the timing controller according to some embodiments.
Figure 5B:
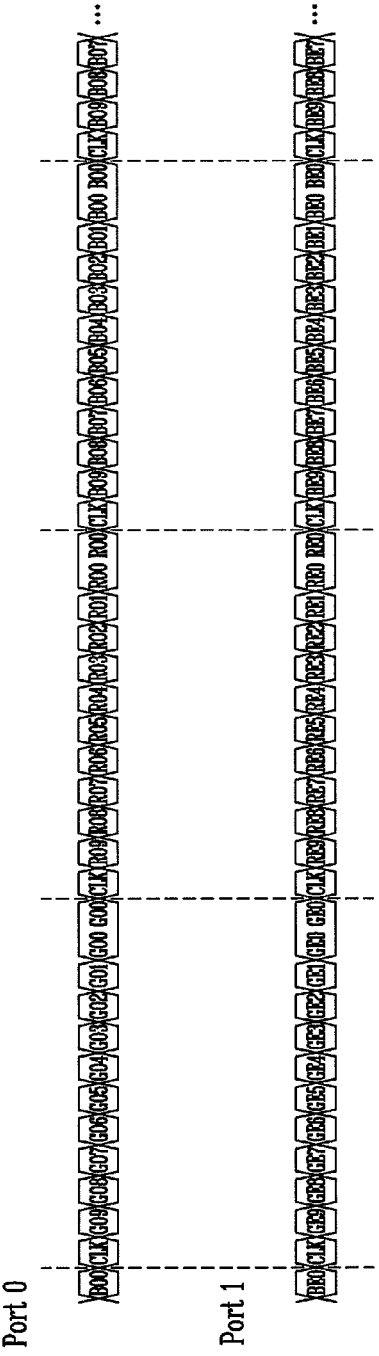

FIGS. 5A and 5B are views illustrating the conventional driving method in comparison with the method of driving the timing controller according to the embodiment of the present invention.

In the case of AiPi+ (advanced intra panel interface+), referring to FIGS. 5A and 5B, when data that represent gray levels of 10 bits is transmitted, the R, G, and B data bits are sequentially transmitted through one port and dummy bits and clock signals are included every data of 10 bits.

Therefore, the total transmission speed is 1.2 times the speed required for transmitting data. In addition, the AiPi+ method supports 2n (n is a natural number) port modes such as 1, 2, and 4 in order to flexibly cope with various resolutions. FIG. 5A illustrates a 1-port mode and FIG. 5B illustrates a 2-port mode.

In order to drive a three dimensional FHD image of 30 bits by 120 Hz, a data bandwidth of total 20 Gbps is required.

However, as described above, in the case of a high speed transmission method such as the AiPi+, since transmission speed of 1.2 times is required for clock transmission, the data bandwidth of total 24 Gbps is required.

In general, in the case of FHD driving, the 8 data drivers 40 are required. In the case of the conventional driving method, since the 1, 2, and 4-port modes are supported, the transmission speed of total 24 Gbps must be obtained through 8, 16, and 32-ports.

However, since the transmission speed per a port of the AiPi+ transmission standard is about 1.1 Gbps, 24 Gbps that is a target data bandwidth may not be obtained through 8 and 16-port modes.

Therefore, in order to achieve 24 Gbps that is the target data bandwidth, a 32-port mode is to be used or transmission speed per a port must be increased to 1.6 Gbps.

However, when the number of transmission ports are increased, the number of pins and the area of an IC are increased, a printed circuit board (PCB) wiring line area is increased, or the number of layers is increased so that product cost increases. When the transmission speed is increased, a developing period increases due to increase in the level of difficulty and complexity of design and power consumption increases in order to maintain signal integrity at high transmission speed.

Meanwhile, in the newly suggested driving method according to some embodiments, since the number of transmission ports between the timing controller 50 and the data drivers 40 is 3, a bandwidth of no less than 24 Gbps may be obtained using 24-ports having the transmission speed of 1.1 Gbps.

Therefore, it is not necessary to increase the number of ports to 32 like in the conventional driving method and to increase the transmission speed.

In addition, when transmission is performed in the differential signal method, 64 transmission lines are required for the 32-port mode. On the other hand, in the 24-port mode according to the present invention, data transmission and reception may be performed only by 48 transmission lines.

On the other hand, in a conventional method, 1, 2, and 4-ports are supported. However, since the data bits required for displaying colors must support three colors of R, G, and B, the number of data bits may generally be equal to a multiple of 3. Therefore, in the conventional method, in order to distribute the transmission data to the respective ports, after increasing the frequency of dot clock DCLK by a factor of 3, division is to be performed in accordance with the number of ports.

Therefore, a frequency synthesizing module for changing the frequency of the dot clock DCLK into a clock required for transmitting data is additionally required for the timing controller 50.

However, in the driving method according to some embodiments, the R, G, and B data are assigned to the respective ports such that it is not necessary to change the frequency of the dot clock DCLK. Therefore, the frequency synthesizing module is not required so that an area is reduced and that operation stability is improved.

According to some embodiments discussed above, a display device capable of securing a bandwidth required for driving a three dimensional image without unnecessarily increasing ports and without increasing the transmission speed of the ports and a method of driving the same are disclosed.

According to some embodiments described above, the display device may be capable of reducing the number of transmission lines in comparison with a conventional driving method. Further, the display device may be capable of removing a frequency synthesizing module to reduce an area and to secure operation stability. A method of driving the display device is also disclosed.

In order to achieve the foregoing and/or other aspects of the disclosed embodiments, a display device is disclosed. The display device includes a display panel configured to display an image, data drivers configured to supply data signals to the display panel so that the display panel displays an image, and a timing controller configured to set the data drivers. The display includes 3n (where n is a natural number) ports. A R transmission signal is transmitted which includes R data bits, a G transmission signal including G data bits is transmitted, and a B transmission signal including B data bits to the data drivers through the 3n ports.

According to some embodiments, dummy bits and clock signals are embedded in the R, G, and B transmission signals. The timing controller may receive a dot clock and image data from an external source.

The R, G, and B transmission signals are transmitted in a differential signal method. The display panel may be one of a liquid crystal display panel, a plasma display panel, and an organic light emitting display panel.

According to some embodiments, a method of driving a display device is disclosed. The method includes setting 3n (where n is a natural number) ports between a timing controller and data drivers and transmitting an R transmission signal including R data bits, a G transmission signal including G data bits, and a B transmission signal including B data bits from the timing controller to the data drivers through different ports.

According to some embodiments, dummy bits and clock signals are embedded in the R, G, and B transmission signals. The timing controller may receive a dot clock and image data from an external source.

The R, G, and B transmission signals may be transmitted in a differential signal method.

As described above, according to some embodiments, it is possible to provide the display device capable of securing the band width required for driving the three dimensional image without unnecessarily increasing the ports and without increasing the transmission speed of the ports and the method of driving the same.

According some embodiments, it is possible to provide the display device capable of reducing the number of transmission lines relative to the conventional driving method. Further, a frequency synthesizing module may be removed, thereby reducing the area of the driving circuitry. Additionally, operational stability may be secured. A method of driving the above described display device is also disclosed.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device, comprising:
   a display panel configured to display an image;
   a plurality of data drivers configured to supply data signals to the display panel; and
   a timing controller comprising:
      a receiving unit configured to receive the R, G, and B data and an external dot clock signal;
      a transmitting unit, the transmitting unit comprising a distributing unit and a plurality of serializing units, wherein the distributing unit is configured to:
         receive a clock signal and the external dot clock signal,
         divide the image data according to an R signal, a G signal, and a B signal using the external dot clock signal, and
         transmit the R, G, and B signals to the plurality of serializing units according to the dot clock signal; and
      wherein the plurality of serializing units are configured to serialize the R, G, and B signals into an R transmission signal, a G transmission signal, and a B transmission signal, and to embed dummy bits and clock signals into the R, G, and B transmission signals;
   wherein the number of data bits transmitted during one period of the dot clock signal is based on the number of gray levels for at least one of the R, G, and B signals; and
   wherein the timing controller is configured to set the data drivers and 3n ports, where n is an integer, and is configured to transmit an R transmission signal including R data bits, a G transmission signal including G data bits, and a B transmission signal including B data bits from each of the plurality of serializing units to the data drivers through the 3n ports.

2. The display device of claim 1, wherein the R, G, and B transmission signals are transmitted through a differential signal transmission method.

3. The display device of claim 1, wherein the display panel is one of a liquid crystal display panel, a plasma display panel, and an organic light emitting diode display panel.

4. The display device of claim 3, wherein the display panel is an OLED display panel.

5. The device of claim 1, wherein the dummy bits and clock signals are transmitted through the 3n ports after each 10 bits of the R data bits, the G data bits, and the B data bits.

6. A method of driving a display device, comprising:
   receiving, in a timing controller, a clock signal, an external dot clock signal, and image data;
   dividing, by a transmitting unit, the image data according to an R signal, a G signal, and a B signal using the external dot clock signal,
   transmitting the R signal, G signal, and B signal to a serializing unit according to the external dot clock signal,
   embedding, in the serializing unit, dummy bits and clock signals in an R transmission signal, a G transmission signal, and a B transmission signal
   wherein the number of data bits transmitted during one period of the dot clock signal is based on the number of gray levels for at least one of the R, G, and B signals;
   setting 3n ports between the timing controller and a data driver, where n is an integer; and
   transmitting the R transmission signal including R data bits, the G transmission signal including G data bits, and the B transmission signal including B data bits from the serializing unit to the data driver through the 3n ports.

7. The method of claim 6, wherein the R, G, and B transmission signals are transmitted in a differential signal transmission method.

8. The method of claim 6, wherein the display device is an OLED.

9. The method of claim 6, further comprising transmitting a dummy bit and a clock signal through the 3n ports after each 10 bits of the R data bits, the G data bits, and the B data bits.

* * * * *